UNITED STATES PATENT OFFICE.

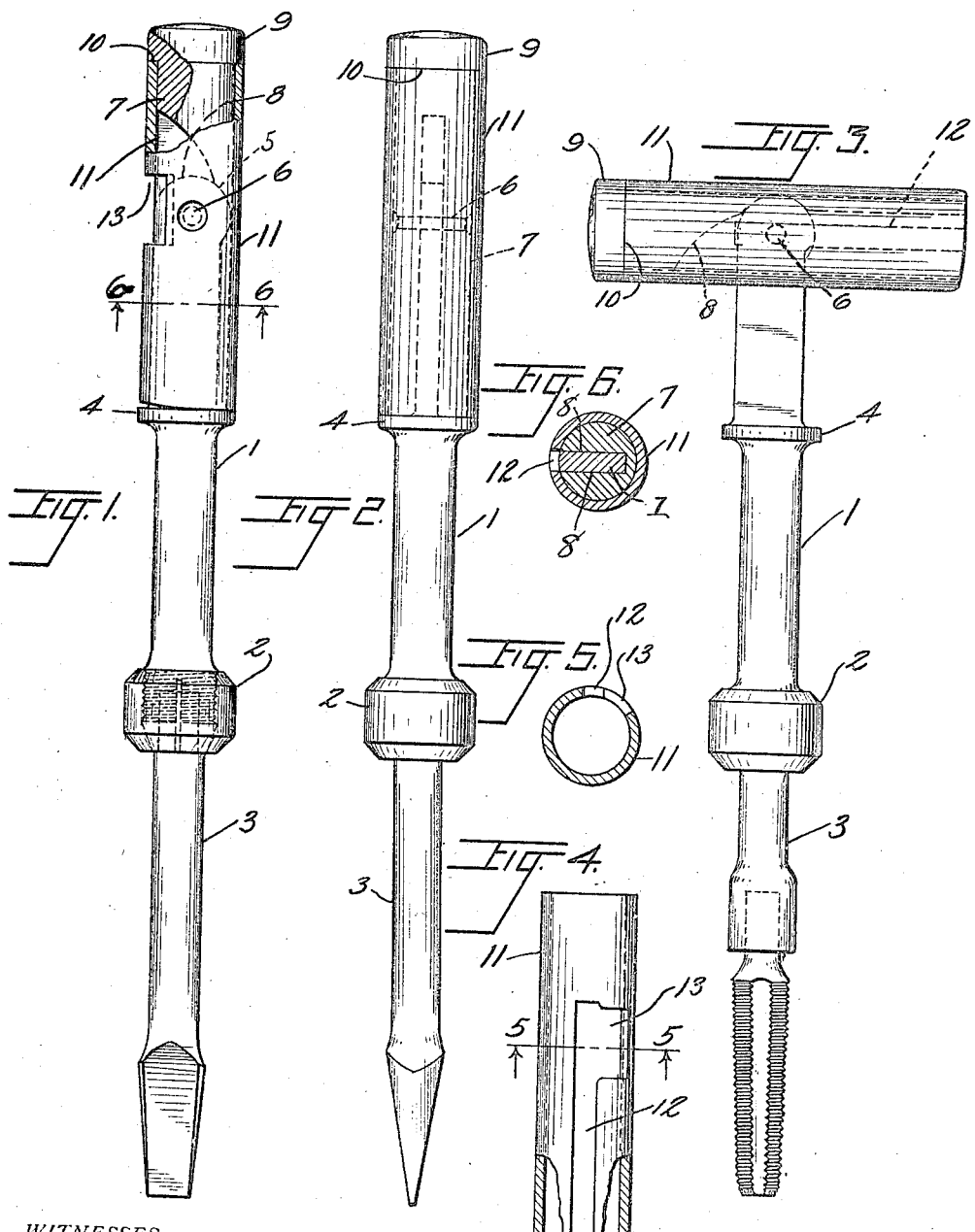

JOHN EDWARD ANDERSON, OF ROCKFORD, ILLINOIS.

TOOL-HANDLE.

1,301,802.             Specification of Letters Patent.   Patented Apr. 29, 1919.

Application filed February 1, 1918. Serial No. 214,935.

*To all whom it may concern:*

Be it known that I, JOHN EDWARD ANDERSON, a citizen of the United States, residing at Rockford, in the county of Winnebago and State of Illinois, have invented certain new and useful Improvements in Tool-Handles, of which the following is a specification.

This invention relates to improvements in tool handles and one object is to provide a tool handle having a hand grip that may be turned in a crosswise position with relation to its shank to afford greater leverage upon the tool, and then locked in this crosswise position; or the hand grip may be used in line with its shank. A further object is to provide a tool handle that is of simple construction and that is durable and efficient in operation.

With the foregoing and other objects in view the invention consists in the combination and arrangement of parts to be hereinafter fully described, pointed out in the appended claims and illustrated in the accompanying drawing which forms a part of this specification and in which—

Figure 1 is an elevation of the tool handle provided with a tool, the hand grip being shown in line with its shank, the hand grip being partly in section to afford a better illustration.

Fig. 2 is a similar view of Fig. 1 but with the device turned at right angles to the position illustrated in Fig. 1.

Fig. 3 is an elevation of the tool handle provided with a different type of tool, the hand grip being shown crosswise to its shank.

Fig. 4 is an elevation, partly in section, of the hand grip sleeve.

Fig. 5 is a cross section taken on line 5—5 of Fig. 4.

Fig. 6 is a cross section taken on line 6—6 of Fig. 1.

Like reference characters denote corresponding parts throughout the several views.

The reference numeral 1 denotes the shank which is provided with the usual chuck 2 to receive tools of various kinds, a screw driver 3 being shown in Figs. 1 and 2 and a threading tap being shown in Fig. 3. Above the collar 4 of the shank the shank is formed flat and terminates in a head 5 which is carried upon the pivot 6 that is disposed transversely in the body portion of the hand grip 7. The said grip 7 is formed with a longitudinally extending open ended slot 8 to receive the flat portion of the said shank 1. The grip 7 is formed with a head 9 formed with an annular shoulder 10 adapted to rest upon one end of a sleeve 11 which incases the said grip 7 and is formed with a longitudinally extending slot 12 which is open at one end and is formed with the widened portion 13 at its opposite or closed end, said sleeve 11 being capable of limited rotary movement about the said grip 7 so that the slots 8 and 12 may be thrown into and out of alinement.

With the slots 8 and 12 in alinement and the grip 7 in alinement with its shank the device is ready for use, or the sleeve 11 and grip 7 may be turned to a position at right angles to the shank 1 as shown in Fig. 3 and the sleeve moved relatively to the grip so that the shank 1 passes through the widened portion 13 of the slot 12, said slot, proper, then being out of alinement with the slot 8 and the lateral edges of the shank having a bearing upon the ends of the widened slot portion 13 so that the grip is positively locked in its crosswise position. To return the tool to a position in line with the shank 1 the sleeve is again moved relatively to the grip until the slots 8 and 12 aline.

What is claimed is:—

1. In a tool handle, a shank having one flat portion, a longitudinally slotted grip terminating at one end in a head, the slotted portion of said grip having pivotally arranged therein the flat portion of said shank, and a longitudinally slotted sleeve encompassing said grip and movable with relation thereto, one end of the slot of said sleeve being widened to receive the flat portion of the said shank.

2. In a tool handle, a shank having one flat portion, a longitudinally slotted grip terminating at one end in a head, the slotted portion of said grip having pivotally arranged therein the flat portion of said shank, and a longitudinally slotted sleeve encompassing said grip and movable with relation thereto, one end of said sleeve in one position thereof abutting the said head, one end of the slot of said sleeve being widened to receive the flat portion of the said shank.

In testimony that I claim the foregoing as my own I have hereto affixed my signature in the presence of two subscribing witnesses.

J. EDWARD ANDERSON.

Witnesses:
C. AUGUST DAHLSTROM,
ARVID L. DAHLSTROM.

Copies of this patent may be obtained for five cents each, by addressing the "Commissioner of Patents, Washington, D. C."